(12) United States Patent
Imaoka et al.

(10) Patent No.: US 8,503,096 B2
(45) Date of Patent: Aug. 6, 2013

(54) INNER FOCUS LENS, INTERCHANGEABLE LENS APPARATUS AND CAMERA SYSTEM

(75) Inventors: Takuya Imaoka, Kanagawa (JP); Koji Hoshi, Kanagawa (JP); Hitoshi Hagimori, Nara (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/441,007

(22) Filed: Apr. 6, 2012

(65) Prior Publication Data

US 2012/0257100 A1    Oct. 11, 2012

(30) Foreign Application Priority Data

Apr. 7, 2011   (JP) ................................. 2011-085154
Feb. 27, 2012  (JP) ................................. 2012-040218

(51) Int. Cl.
*G02B 15/14*    (2006.01)
*G02B 7/02*     (2006.01)

(52) U.S. Cl.
USPC ........... 359/684; 359/683; 359/685; 359/686; 359/716; 359/740; 359/785; 359/827

(58) Field of Classification Search
USPC .................. 359/683–686, 716, 740, 785, 827
See application file for complete search history.

(56) References Cited

U.S. PATENT DOCUMENTS 5,717,527 A * 2/1998 Shibayama ................... 359/690

FOREIGN PATENT DOCUMENTS

JP    S50-138823    11/1975

* cited by examiner

*Primary Examiner* — Evelyn A. Lester
(74) *Attorney, Agent, or Firm* — Judge Patent Associates

(57) ABSTRACT

An inner focus lens, in order from an object side to an image side, comprising: a first lens unit having positive optical power; a second lens unit having negative optical power; and a third lens unit having positive optical power, wherein the second lens unit is moved along an optical axis so that focusing from an infinite-distance object side to a short-distance object side is achieved, the first lens unit includes a bi-convex air lens, and the following conditions: $0.65<|f_2/f|<5.00$ and $0.5<f_{23}/f_1<9.0$ ($f_2$: a focal length of the entire system and a composite focal length of the second and third lens units in an infinity in-focus condition, $f_1$: a focal length of the first lens unit) are satisfied; an interchangeable lens apparatus; and a camera system are provided.

9 Claims, 7 Drawing Sheets

INNER FOCUS LENS, INTERCHANGEABLE LENS APPARATUS AND CAMERA SYSTEM

CROSS-REFERENCE TO RELATED APPLICATION

This application is based on application No. 2011-085154 filed in Japan on Apr. 7, 2011 and application No. 2012-040218 filed in Japan on Feb. 27, 2012, the contents of which are hereby incorporated by reference.

BACKGROUND OF THE INVENTION

1. Field of the Invention

The present invention relates to inner focus lenses, interchangeable lens apparatuses, and camera systems. Specifically, the present invention relates to: inner focus lenses suitable for an interchangeable lens apparatus attachable to a digital single-lens reflex camera or a single-lens reflex camera using silver salt films, a digital still camera, a camcorder, and the like; and interchangeable lens apparatuses and camera systems employing these inner focus lenses.

2. Description of the Background Art

In association with increases in the number of pixels of solid-state image sensors in recent years, imaging optical systems employed for them are requested to have higher performance as well as to be a bright lens having a small F-number. Further, strong demands are present for higher-speed focusing and for lenses in which image vibration at the time of focusing is reduced. Moreover, strong demands are present also for size reduction and cost reduction in the optical systems, and hence such optical systems are requested to be constructed from a small number of lenses.

In order that such demands should be satisfied, a lens system disclosed in Japanese Laid-Open Patent Publication No. S50-138823 has been proposed which is a so-called Gauss type lens system, in order from the object side to the image side, comprising a front lens unit having positive refractive power and a rear lens unit having positive refractive power and in which focusing is achieved by a positive lens unit included in the rear lens unit. In such a Gauss type lens system, a large aperture is implemented and yet, compensation of aberration is achieved easily.

However, in the lens system disclosed in Japanese Laid-Open Patent Publication No. S50-138823, focusing is performed by the positive lens unit included in the rear lens unit. This causes an increase in the amount of movement of the positive lens unit at the time of focusing, and hence high-speed focusing demanded in recent years is not realized.

SUMMARY OF THE INVENTION

An object of the present invention is to provide an inner focus lens having a large aperture and yet capable of high-speed focusing; and an interchangeable lens apparatus and a camera system employing this inner focus lens.

The novel concepts disclosed herein were achieved in order to solve the foregoing problems in the conventional art, and herein is disclosed:

an inner focus lens, in order from an object side to an image side, comprising:
a first lens unit having positive optical power;
a second lens unit having negative optical power; and
a third lens unit having positive optical power, wherein
the second lens unit is moved along an optical axis so that focusing from an infinite-distance object side to a short-distance object side is achieved,
the first lens unit includes a bi-convex air lens, and
the following conditions (1) and (2) are satisfied:

$$0.65 < |f_2/f| < 5.00 \quad (1)$$

$$0.5 < f_{23}/f_1 < 9.0 \quad (2)$$

where,
$f_2$ is a focal length of the second lens unit,
$f$ is a focal length of the entire system in an infinity in-focus condition,
$f_{23}$ is a composite focal length of the second lens unit and the third lens unit in an infinity in-focus condition, and
$f_1$ is a focal length of the first lens unit.

The novel concepts disclosed herein were achieved in order to solve the foregoing problems in the conventional art, and herein is disclosed:

an interchangeable lens apparatus comprising:
an inner focus lens; and
a lens mount section which is connectable to a camera body including an image sensor for receiving an optical image formed by the inner focus lens and converting the optical image into an electric image signal, wherein
the inner focus lens, in order from an object side to an image side, comprises:
a first lens unit having positive optical power;
a second lens unit having negative optical power; and
a third lens unit having positive optical power, wherein
the second lens unit is moved along an optical axis so that focusing from an infinite-distance object side to a short-distance object side is achieved,
the first lens unit includes a bi-convex air lens, and
the following conditions (1) and (2) are satisfied:

$$0.65 < |f_2/f| < 5.00 \quad (1)$$

$$0.5 < f_{23}/f_1 < 9.0 \quad (2)$$

where,
$f_2$ is a focal length of the second lens unit,
$f$ is a focal length of the entire system in an infinity in-focus condition,
$f_{23}$ is a composite focal length of the second lens unit and the third lens unit in an infinity in-focus condition, and
$f_1$ is a focal length of the first lens unit.

The novel concepts disclosed herein were achieved in order to solve the foregoing problems in the conventional art, and herein is disclosed:

a camera system comprising:
an interchangeable lens apparatus including an inner focus lens; and
a camera body which is detachably connected to the interchangeable lens apparatus via a camera mount section, and includes an image sensor for receiving an optical image formed by the inner focus lens and converting the optical image into an electric image signal, wherein
the inner focus lens, in order from an object side to an image side, comprises:
a first lens unit having positive optical power;
a second lens unit having negative optical power; and
a third lens unit having positive optical power, wherein
the second lens unit is moved along an optical axis so that focusing from an infinite-distance object side to a short-distance object side is achieved,
the first lens unit includes a bi-convex air lens, and
the following conditions (1) and (2) are satisfied:

$$0.65 < |f_2/f| < 5.00 \quad (1)$$

$$0.5 < f_{23}/f_1 < 9.0 \quad (2)$$

where, $f_2$ is a focal length of the second lens unit, f is a focal length of the entire system in an infinity in-focus condition, $f_{23}$ is a composite focal length of the second lens unit and the third lens unit in an infinity in-focus condition, and $f_1$ is a focal length of the first lens unit.

The present invention provides: an inner focus lens in which the construction is realized by a small number of lens elements and yet various kinds of aberrations are compensated satisfactorily and in which the amount of movement of a focusing lens unit at the time of focusing is small and the focusing lens unit has a light weight and hence, although a large aperture is implemented, high-speed focusing is achieved; and an interchangeable lens apparatus and a camera system employing this inner focus lens.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
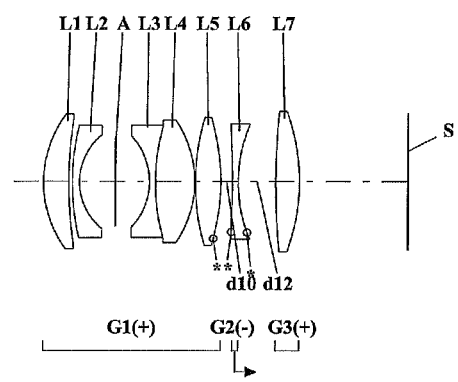
FIG. 1 is a lens arrangement diagram showing an infinity in-focus condition of an inner focus lens according to Embodiment 1 (Example 1)
Figure 2:
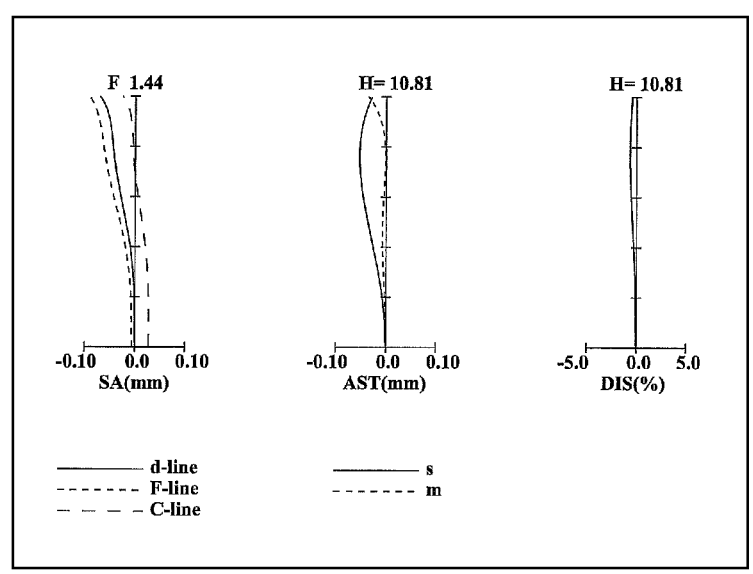
FIG. 2 is a longitudinal aberration diagram of an infinity in-focus condition of an inner focus lens according to Example 1.

An inner focus lens according to the present invention, in order from an object side to an image side, comprises a first lens unit having positive optical power, a second lens unit having negative optical power, and a third lens unit having positive optical power. Then, the second lens unit is moved along an optical axis so that focusing from an infinite-distance object side to a short-distance object side is achieved. Further, the first lens unit includes a bi-convex air lens. Here, an air space between two lens elements is regarded as a lens having a refractive index of approximately 1, and the air space is referred to as an air lens.

In the lens configuration of the inner focus lens according to the present invention, by virtue of light-beam converging operation achieved by the positive optical power of the first lens unit, the lens outer diameter of the second lens unit serving as a focusing lens unit can be reduced. Thus, weight reduction is achieved in the focusing lens unit. Further, when the focusing lens unit is driven by an auto-focusing mechanism based on electric lens drive, high-speed focusing is achieved.

In the above-mentioned lens configuration, on the object side and the image side relative to the second lens unit having negative optical power and serving as a focusing lens unit, the first lens unit having positive optical power and the third lens unit having positive optical power are arranged, respectively. This enhances magnification of the second lens unit. As a result, the amount of movement of the focusing lens unit is reduced. Thus, when the focusing lens unit is driven by an auto-focusing mechanism based on electric lens drive, high-speed focusing is achieved.

In the above-mentioned lens configuration, on the image side relative to the second lens unit having negative optical power, the third lens unit having positive optical power is arranged. Thus, without the necessity of increasing back distance of the inner focus lens, the exit pupil position can be located at a position farther from an image surface. As a result, when the inner focus lens is applied to a camera provided with a solid-state image sensor, light-condensing performance of micro lenses provided in front of the solid-state image sensor can be utilized satisfactorily.

In the above-mentioned lens configuration, the first lens unit having positive optical power includes a bi-convex air lens. Thus, in the inner focus lens, a large aperture is implemented and yet, even a small number of lens elements can easily compensate spherical aberration, astigmatism, and the like so as to reduce the remaining aberration in the first lens unit as small as possible. As a result, contribution to compensation of aberration of the second lens unit serving as a focusing lens unit decreases and hence the second lens unit is allowed to be constructed from a small number of lens elements. Thus, weight reduction of the focusing lens unit and size reduction of the inner focus lens are achieved.

In the above-mentioned lens configuration, it is preferable that the second lens unit is composed of a single unit having negative optical power like a cemented lens element having negative optical power or a single lens element having negative optical power. Further, it is more preferable that the single unit having negative optical power is composed of one single lens element having negative optical power. In this case, further weight reduction of the focusing lens unit and further size reduction of the inner focus lens are achieved.

In the inner focus lens according to the present invention, the following condition (1) is satisfied.

$$0.65 < |f_2/f| < 5.00 \qquad (1)$$

where, $f_2$ is a focal length of the second lens unit, and f is a focal length of the entire system in an infinity in-focus condition.

The condition (1) sets forth the ratio between the focal length of the second lens unit and the focal length of the entire system of the inner focus lens. When the value goes below the lower limit of the condition (1), the optical power of the second lens unit becomes strong and hence it becomes difficult to construct the second lens unit from a small number of lens elements. On the other hand, when the value exceeds the upper limit of the condition (1), the optical power of the second lens unit becomes weak and hence the amount of movement at the time of focusing increases. This prevents high-speed focusing and size reduction in the inner focus lens.

When at least one of the following conditions (1)' and (1)" is satisfied, the above-mentioned effect is achieved more successfully.

$$0.68<|f_2/f| \tag{1}'$$

$$|f_2/f|<4.00 \tag{1}''$$

In the inner focus lens according to the present invention, in addition to that the condition (1) is satisfied, the following condition (2) is satisfied.

$$0.5<f_{23}/f_1<9.0 \tag{2}$$

where, $f_{23}$ is a composite focal length of the second lens unit and the third lens unit in an infinity in-focus condition, and $f_1$ is a focal length of the first lens unit.

The condition (2) sets forth the ratio between the composite focal length of the second lens unit and the third lens unit, and the focal length of the first lens unit. When the value goes below the lower limit of the condition (2), the optical power of the first lens unit becomes weak and hence size increase becomes unavoidable in the first lens unit. This prevents size reduction of the inner focus lens. On the other hand, when the value exceeds the upper limit of the condition (2), the composite optical power of the second lens unit and the third lens unit becomes weak. This prevents a larger-aperture construction of the inner focus lens.

When at least one of the following conditions (2)' and (2)" is satisfied, the above-mentioned effect is achieved more successfully.

$$1.5<f_{23}/f_1 \tag{2}'$$

$$f_{23}/f_1<6.0 \tag{2}''$$

In the inner focus lens according to the present invention, it is preferable that the first lens unit includes a bi-convex air lens having an object side "a" surface and an image side "b" surface and that the following condition (3) is satisfied.

$$-0.5<SF<0.5 \tag{3}$$

where, $$SF=(Ra+Rb)/(Rb-Ra),$$

Ra is a radius of curvature of an object side "a" surface of the bi-convex air lens included in the first lens unit, and Rb is a radius of curvature of an image side "b" surface of the bi-convex air lens included in the first lens unit.

The condition (3) sets forth the shape of the bi-convex air lens included in the first lens unit. The condition (3) indicates that the absolute value of the radius of curvature of the object side "a" surface is close to the absolute value of the radius of curvature of the image side "b" surface. When the condition (3) is satisfied, various kinds of aberrations such as spherical aberration and astigmatism generated in the first lens unit can be compensated satisfactorily by a small number of lens elements.

When at least one of the following conditions (3)' and (3)" is satisfied, the above-mentioned effect is achieved more successfully.

$$-0.1<SF \tag{3}'$$

$$SF<0.2 \tag{3}''$$

In the inner focus lens according to the present invention, it is preferable that the following condition (4) is satisfied.

$$0.02<D_2/\{f \times \tan(\omega)\}<0.30 \tag{4}$$

where, $D_2$ is an optical axial thickness of the second lens unit, $f$ is a focal length of the entire system in an infinity in-focus condition, and $\omega$ is a half view angle (°) of the entire system in an infinity in-focus condition.

The condition (4) sets forth the ratio between the optical axial thickness of the second lens unit and the image height. When the value goes below the lower limit of the condition (4), the optical axial thickness of the second lens unit becomes small and hence fabrication of the lens becomes difficult. On the other hand, when the value exceeds the upper limit of the condition (4), the optical axial thickness of the second lens unit becomes large. This prevents weight reduction of the focusing lens unit and size reduction of the inner focus lens.

When at least one of the following conditions (4)' and (4)" is satisfied, the above-mentioned effect is achieved more successfully.

$$0.05<D_2/\{f \times \tan(\omega)\} \tag{4}'$$

$$D_2/\{f \times \tan(\omega)\}<0.15 \tag{4}''$$

It is preferable that the inner focus lens according to the present invention is provided with an aperture diaphragm for restricting axial light beam and that the following condition (5) is satisfied.

$$0.5<f_{sb}/f<3.0 \tag{5}$$

where, $f_{sb}$ is a composite focal length of lens elements located on the image side relative to the aperture diaphragm in an infinity in-focus condition, and $f$ is a focal length of the entire system in an infinity in-focus condition.

The condition (5) sets forth the ratio between the composite focal length of the lens elements located on the image side relative to the aperture diaphragm in an infinity in-focus condition and the focal length of the entire system of the inner focus lens in an infinity in-focus condition. When the value goes below the lower limit of the condition (5), the composite optical power of the lens elements located on the image side relative to the aperture diaphragm becomes strong and hence it becomes difficult to construct the inner focus lens from a small number of lens elements. This prevents size reduction of the inner focus lens. On the other hand, when the value exceeds the upper limit of the condition (5), the composite optical power of the lens elements located on the image side relative to the aperture diaphragm becomes weak. This prevents a larger-aperture construction of the inner focus lens.

When at least one of the following conditions (5)' and (5)" is satisfied, the above-mentioned effect is achieved more successfully.

$$0.7<f_{sb}/f \tag{5}'$$

$$f_{sb}/f<2.0 \tag{5}''$$

In the inner focus lens according to the present invention, it is preferable that the following condition (6) is satisfied.

$$0.2<|(1-\beta_2)\times\beta_3|<0.9 \qquad (6)$$

where, $\beta_2$ is a lateral magnification of the second lens unit in an infinity in-focus condition, and $\beta_3$ is a lateral magnification of the third lens unit in an infinity in-focus condition.

The condition (6) sets forth deviation of the optical axis generates by decentering in a direction perpendicular to the optical axis of the focusing lens unit. When the value exceeds the upper limit of the condition (6), deviation of the optical axis becomes large owing to backlash generated in a direction perpendicular to the optical axis of the focusing lens unit during drive of the focusing lens unit. That is, the phenomenon of vibration of the image during focusing becomes remarkable and hence it becomes difficult to satisfy the lens requirement of reduced image vibration. On the other hand, when the value goes below the lower limit of the condition (6), the magnification of the second lens unit becomes close to 1 and hence the amount of movement at the time of focusing becomes large. This prevents size reduction and high-speed focusing in the inner focus lens.

When at least one of the following conditions (6)' and (6)" is satisfied, the above-mentioned effect is achieved more successfully.

$$0.48<|(1-\beta_2)\times\beta_3| \qquad (6)'$$

$$|(1-\beta_2)\times\beta_3|<0.86 \qquad (6)''$$

For example, inner focus lenses according to Embodiments 1 to 6 described below satisfy all the conditions (1) to (6). The configuration of such an inner focus lens satisfying a plurality of the conditions is most preferable. However, an inner focus lens may satisfy an individual condition so as to achieve the corresponding effect.

(Embodiments 1 to 6)

Detailed embodiments for the inner focus lens according to the present invention are described below with reference to the drawings.

In each Fig., an asterisk "*" imparted to a particular surface indicates that the surface is aspheric. Symbol (+) or (−) imparted to the symbol of each lens unit corresponds to the sign of the optical power of each lens unit. An arrow imparted to each lens unit indicates the moving direction at the time of focusing from an infinite-distance object side to a short-distance object side. Further, a straight line located on the most right-hand side indicates the position of an image surface S.

FIG. 1 is a lens arrangement diagram showing an infinity in-focus condition of the inner focus lens according to Embodiment 1.

The inner focus lens according to Embodiment 1, in order from an object side to an image side, comprises a first lens unit G1 having positive optical power, a second lens unit G2 having negative optical power, and a third lens unit G3 having positive optical power. In the inner focus lens according to Embodiment 1, the conditions (1) to (6) are satisfied.

The first lens unit G1, in order from the object side to the image side, comprises: a positive meniscus first lens element L1 with the convex surface facing the object side; a negative meniscus second lens element L2 with the stronger-curvature concave surface facing the image side; an aperture diaphragm A; a cemented lens element constructed from a bi-concave third lens element L3 with the stronger-curvature concave surface facing the object side and a bi-convex fourth lens element L4; and a bi-convex fifth lens element L5 having an aspheric image side surface. In the first lens unit G1, the space between the second lens element L2 and the third lens element L3 forms a bi-convex air lens.

The second lens unit G2 comprises solely a bi-concave sixth lens element L6 having two aspheric surfaces with the stronger-curvature concave surface facing the image side. Then, the second lens unit G2 is moved to the image side along the optical axis so that focusing from the infinite-distance object side to the short-distance object side is achieved.

The third lens unit G3 comprises solely a bi-convex seventh lens element L7.

Figure 3:
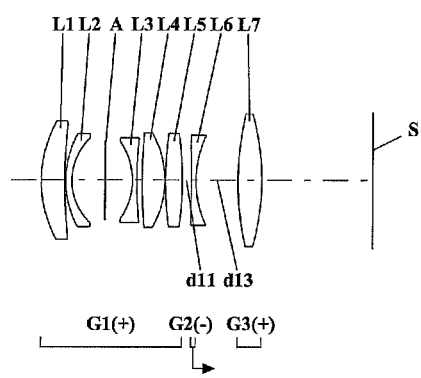
FIG. 3 is a lens arrangement diagram showing an infinity in-focus condition of an inner focus lens according to Embodiment 2 (Example 2)
Figure 4:
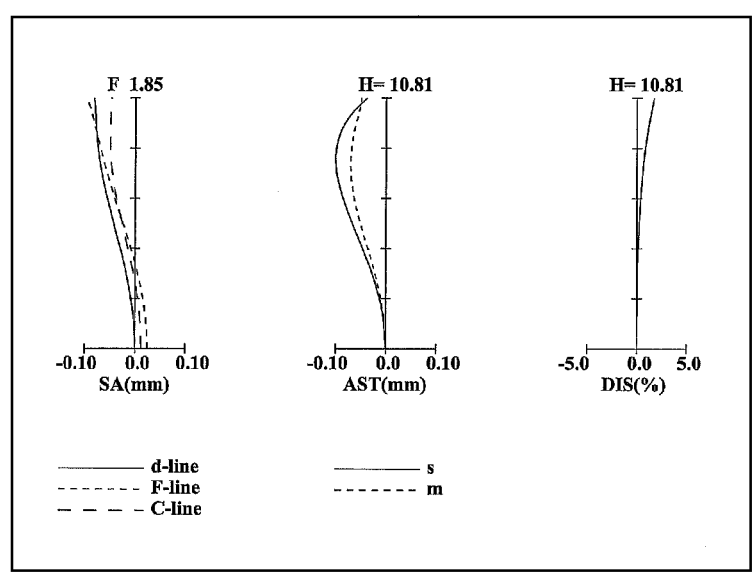
FIG. 4 is a longitudinal aberration diagram of an infinity in-focus condition of an inner focus lens according to Example 2.

FIG. 3 is a lens arrangement diagram showing an infinity in-focus condition of the inner focus lens according to Embodiment 2.

The inner focus lens according to Embodiment 2, in order from an object side to an image side, comprises a first lens unit G1 having positive optical power, a second lens unit G2 having negative optical power, and a third lens unit G3 having positive optical power. In the inner focus lens according to Embodiment 2, the conditions (1) to (6) are satisfied.

The first lens unit G1, in order from the object side to the image side, comprises: a positive meniscus first lens element L1 with the convex surface facing the object side; a negative meniscus second lens element L2 with the stronger-curvature concave surface facing the image side; an aperture diaphragm A; a bi-concave third lens element L3 with the stronger-curvature concave surface facing the object side; a bi-convex fourth lens element L4; and a bi-convex fifth lens element L5. In the first lens unit G1, the space between the second lens element L2 and the third lens element L3 forms a bi-convex air lens.

The second lens unit G2 comprises solely a bi-concave sixth lens element L6 with the stronger-curvature concave surface facing the image side. Then, the second lens unit G2 is moved to the image side along the optical axis so that focusing from the infinite-distance object side to the short-distance object side is achieved.

The third lens unit G3 comprises solely a bi-convex seventh lens element L7.

Figure 5:
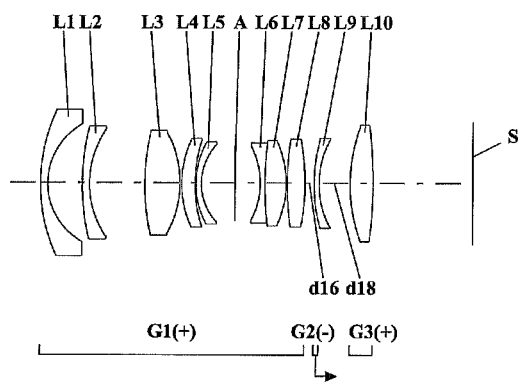
FIG. 5 is a lens arrangement diagram showing an infinity in-focus condition of an inner focus lens according to Embodiment 3 (Example 3)
Figure 6:
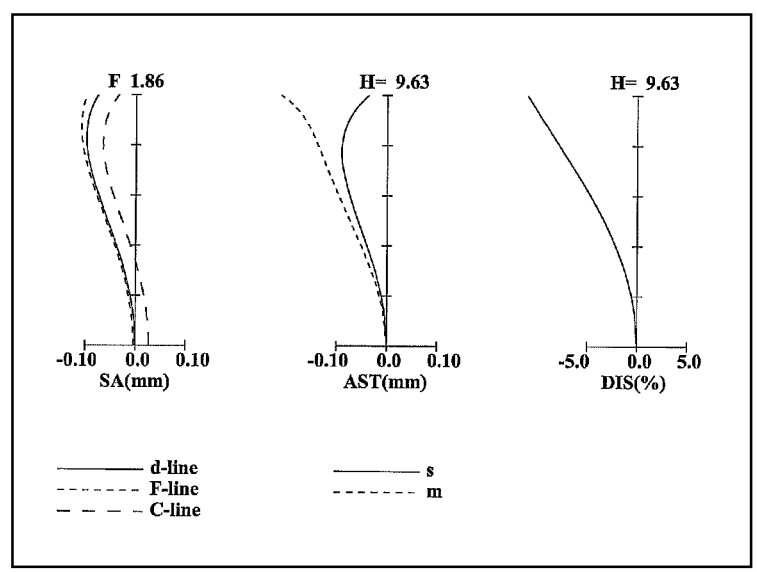
FIG. 6 is a longitudinal aberration diagram of an infinity in-focus condition of an inner focus lens according to Example 3.

FIG. 5 is a lens arrangement diagram showing an infinity in-focus condition of the inner focus lens according to Embodiment 3.

The inner focus lens according to Embodiment 3, in order from an object side to an image side, comprises a first lens unit G1 having positive optical power, a second lens unit G2 having negative optical power, and a third lens unit G3 having positive optical power. In the inner focus lens according to Embodiment 3, the conditions (1) to (6) are satisfied.

The first lens unit G1, in order from the object side to the image side, comprises: a negative meniscus first lens element L1 with the stronger-curvature concave surface facing the image side; a negative meniscus second lens element L2 with the convex surface facing the object side; a bi-convex third lens element L3; a positive meniscus fourth lens element L4 with the convex surface facing the object side; a negative meniscus fifth lens element L5 with the stronger-curvature concave surface facing the image side; an aperture diaphragm A; a cemented lens element constructed from a bi-concave sixth lens element L6 with the stronger-curvature concave surface facing the object side and a bi-convex seventh lens element L7; and a bi-convex eighth lens element L8. In the first lens unit G1, the space between the fifth lens element L5 and the sixth lens element L6 forms a bi-convex air lens.

The second lens unit G2 comprises solely a negative meniscus ninth lens element L9 with the stronger-curvature concave surface facing the image side. Then, the second lens unit G2 is moved to the image side along the optical axis so that focusing from the infinite-distance object side to the short-distance object side is achieved.

The third lens unit G3 comprises solely a bi-convex tenth lens element L10.

Figure 7:
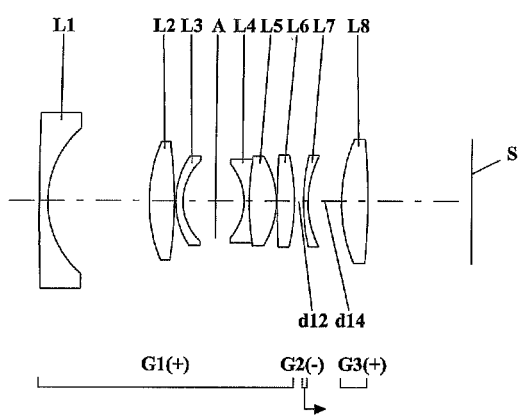
FIG. 7 is a lens arrangement diagram showing an infinity in-focus condition of an inner focus lens according to Embodiment 4 (Example 4)
Figure 8:
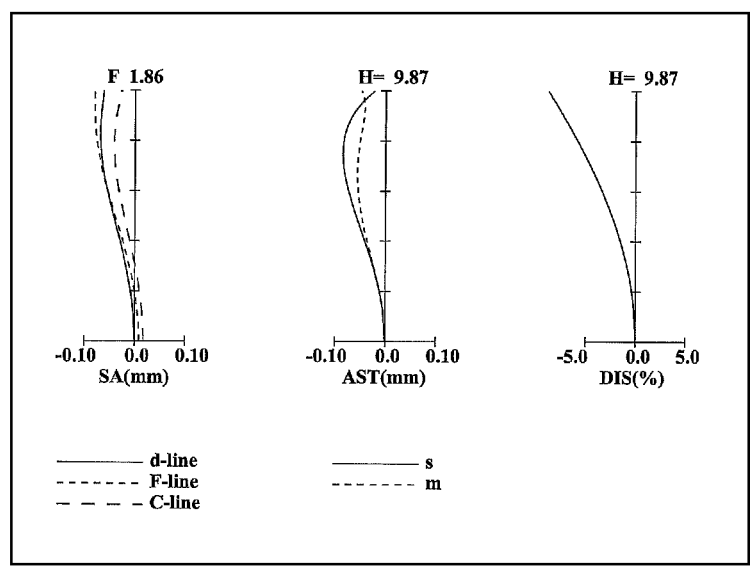
FIG. 8 is a longitudinal aberration diagram of an infinity in-focus condition of an inner focus lens according to Example 4.

FIG. 7 is a lens arrangement diagram showing an infinity in-focus condition of the inner focus lens according to Embodiment 4.

The inner focus lens according to Embodiment 4, in order from an object side to an image side, comprises a first lens unit G1 having positive optical power, a second lens unit G2 having negative optical power, and a third lens unit G3 having positive optical power. In the inner focus lens according to Embodiment 4, the conditions (1) to (6) are satisfied.

The first lens unit G1, in order from the object side to the image side, comprises: a negative meniscus first lens element L1 with the stronger-curvature concave surface facing the image side; a bi-convex second lens element L2; a negative meniscus third lens element L3 with the stronger-curvature concave surface facing the image side; an aperture diaphragm A; a cemented lens element constructed from a bi-concave fourth lens element L4 with the stronger-curvature concave surface facing the object side and a bi-convex fifth lens element L5; and a bi-convex sixth lens element L6. In the first lens unit G1, the space between the third lens element L3 and the fourth lens element L4 forms a bi-convex air lens.

The second lens unit G2 comprises solely a negative meniscus seventh lens element L7 with the stronger-curvature concave surface facing the image side. Then, the second lens unit G2 is moved to the image side along the optical axis so that focusing from the infinite-distance object side to the short-distance object side is achieved.

The third lens unit G3 comprises solely a bi-convex eighth lens element L8.

Figure 9:
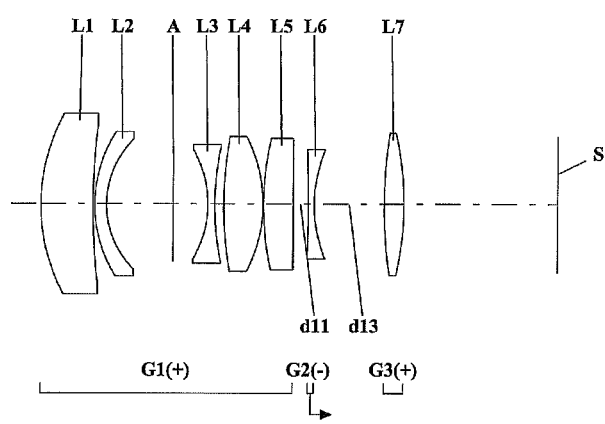
FIG. 9 is a lens arrangement diagram showing an infinity in-focus condition of an inner focus lens according to Embodiment 5 (Example 5)
Figure 10:
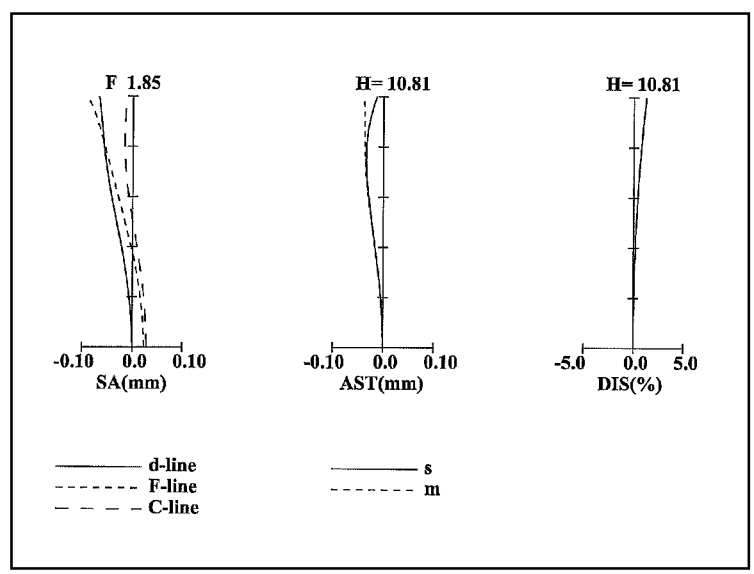
FIG. 10 is a longitudinal aberration diagram of an infinity in-focus condition of an inner focus lens according to Example 5.

FIG. 9 is a lens arrangement diagram showing an infinity in-focus condition of the inner focus lens according to Embodiment 5.

The inner focus lens according to Embodiment 5, in order from an object side to an image side, comprises a first lens unit G1 having positive optical power, a second lens unit G2 having negative optical power, and a third lens unit G3 having positive optical power. In the inner focus lens according to Embodiment 5, the conditions (1) to (6) are satisfied.

The first lens unit G1, in order from the object side to the image side, comprises: a positive meniscus first lens element L1 with the convex surface facing the object side; a negative meniscus second lens element L2 with the stronger-curvature concave surface facing the image side; an aperture diaphragm A; a bi-concave third lens element L3 with the stronger-curvature concave surface facing the object side; a bi-convex fourth lens element L4; and a positive meniscus fifth lens element L5 with the convex surface facing the object side. In the first lens unit G1, the space between the second lens element L2 and the third lens element L3 forms a bi-convex air lens.

The second lens unit G2 comprises solely a bi-concave sixth lens element L6 with the stronger-curvature concave surface facing the image side. Then, the second lens unit G2 is moved to the image side along the optical axis so that focusing from the infinite-distance object side to the short-distance object side is achieved.

The third lens unit G3 comprises solely a bi-convex seventh lens element L7.

Figure 11:
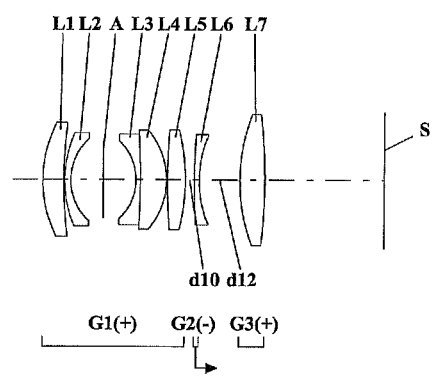
FIG. 11 is a lens arrangement diagram showing an infinity in-focus condition of an inner focus lens according to Embodiment 6 (Example 6)
Figure 12:
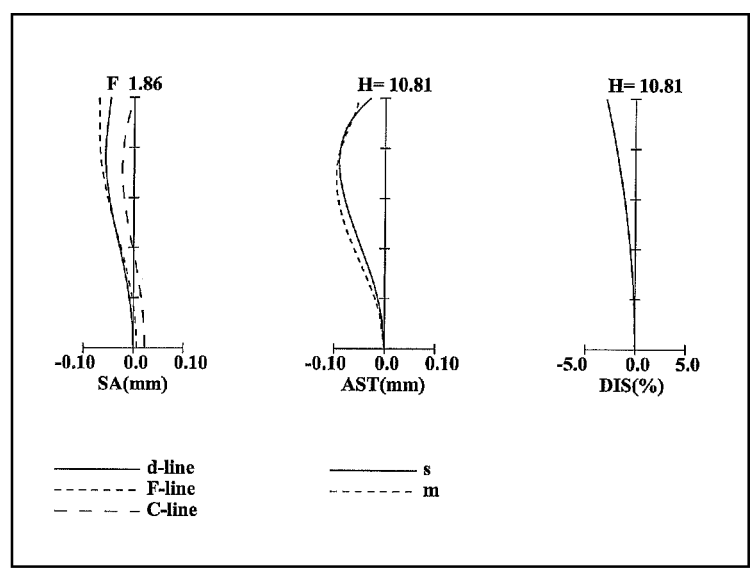
FIG. 12 is a longitudinal aberration diagram of an infinity in-focus condition of an inner focus lens according to Example 6.

FIG. 11 is a lens arrangement diagram showing an infinity in-focus condition of the inner focus lens according to Embodiment 6.

The inner focus lens according to Embodiment 6, in order from an object side to an image side, comprises a first lens unit G1 having positive optical power, a second lens unit G2 having negative optical power, and a third lens unit G3 having positive optical power. In the inner focus lens according to Embodiment 6, the conditions (1) to (6) are satisfied.

The first lens unit G1, in order from the object side to the image side, comprises: a positive meniscus first lens element L1 with the convex surface facing the object side; a negative meniscus second lens element L2 with the stronger-curvature concave surface facing the image side; an aperture diaphragm A; a cemented lens element constructed from a negative meniscus third lens element L3 with the stronger-curvature concave surface facing the object side and a positive meniscus fourth lens element L4 with the convex surface facing the image side; and a bi-convex fifth lens element L5. In the first lens unit G1, the space between the second lens element L2 and the third lens element L3 forms a bi-convex air lens.

The second lens unit G2 comprises solely a negative meniscus sixth lens element L6 with the stronger-curvature concave surface facing the image side. Then, the second lens unit G2 is moved to the image side along the optical axis so that focusing from the infinite-distance object side to the short-distance object side is achieved.

The third lens unit G3 comprises solely a bi-convex seventh lens element L7.

(Embodiment 7)

Figure 13:
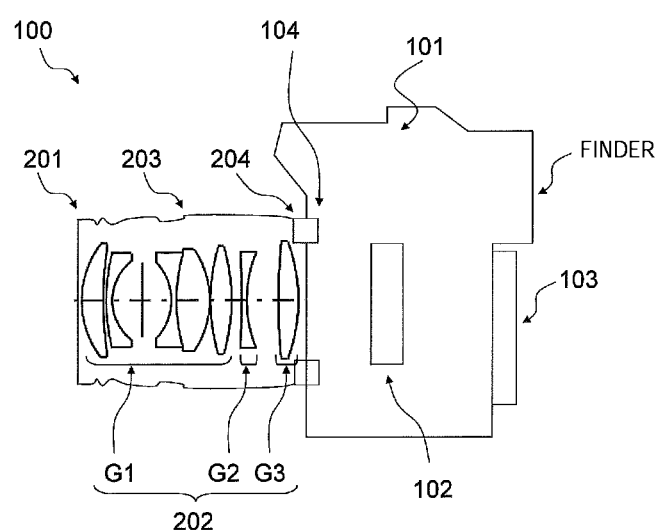
FIG. 13 is a schematic construction diagram of an interchangeable-lens type digital camera system according to Embodiment 7.

FIG. 13 is a schematic construction diagram of an interchangeable-lens type digital camera system according to Embodiment 7.

The interchangeable-lens type digital camera system 100 according to Embodiment 7 includes a camera body 101, and an interchangeable lens apparatus 201 which is detachably connected to the camera body 101.

The camera body 101 includes: an image sensor 102 which receives an optical image formed by an inner focus lens 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: an inner focus lens 202 according to any of Embodiments 1 to 6; a lens barrel 203 which holds the inner focus lens 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 13, the inner focus lens according to Embodiment 1 is employed as the inner focus lens 202.

In Embodiment 7, since the inner focus lens 202 according to any of Embodiments 1 to 6 is employed, a compact interchangeable lens apparatus having excellent imaging performance can be realized at low cost. Moreover, size reduction and cost reduction of the entire camera system 100 according to Embodiment 7 can be achieved.

The following description is given for numerical examples in which the inner focus lenses according to Embodiments 1 to 6 are implemented practically. In the numerical examples, the units of the length in the tables are all "mm", while the units of the view angle are all "°". In the numerical examples, the "surface number" indicates that the surface is the i-th surface when counted from the object side. Further, "r"

denotes the paraxial radius of curvature of the i-th surface counted from the object side, "d" denotes the axial distance between the i-th surface and the (i+1)-th surface, "nd" denotes the refractive index to the d-line (wavelength: 587.6 nm) of the glass material whose object side is the i-th surface, and "vd" denotes the Abbe number to the d-line of the glass material whose object side is the i-th surface. Term "variable" indicates that the axial distance of the interval between the surfaces is variable. Further, each surface marked with "*" after the surface number i indicates an aspheric surface. The aspheric surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 4, 6, 8, 10, and 12 are longitudinal aberration diagrams of an infinity in-focus condition of the inner focus lenses according to Numerical Examples 1 to 6, respectively. Each longitudinal aberration diagram, in order from the left-hand side, shows the spherical aberration, the astigmatism, and the distortion. In each spherical aberration diagram, the vertical axis indicates the ratio to the open F-number (minimum F-number), and the horizontal axis indicates the defocusing. Further, the solid line, the long dash line, and the short dash line indicate the spherical aberration to the d-line, to the C-line (wavelength: 656.3 nm), and to the F-line (wavelength: 486.1 nm), respectively. In each astigmatism diagram, the vertical axis indicates the image height, and the horizontal axis indicates the focus. Further, the solid line and the dash line indicate the astigmatism in the sagittal image surface and in the meridional image surface, respectively. In each distortion diagram, the vertical axis indicates the image height, and the distortion is expressed in %.

The following Tables 1 to 6 show the lens data of the inner focus lenses according to Numerical Examples 1 to 6, respectively.

TABLE 1

(Numerical Example 1)

Surface data

| Surface number | r | d | nd | vd | Effective diameter |
|---|---|---|---|---|---|
| Object surface | ∞ | | | | |
| 1 | 18.74540 | 4.20230 | 1.88300 | 40.8 | 10.699 |
| 2 | 68.34600 | 0.58830 | | | 9.850 |
| 3 | 39.42090 | 1.20000 | 1.51198 | 54.6 | 8.840 |
| 4 | 10.02710 | 5.97820 | | | 7.316 |
| 5(Diaphragm) | ∞ | 5.64000 | | | 6.953 |
| 6 | −11.03380 | 1.00000 | 1.80518 | 25.5 | 7.078 |
| 7 | 34.67830 | 6.54960 | 1.88300 | 40.8 | 8.805 |
| 8 | −17.84130 | 0.10000 | | | 9.665 |
| 9 | 37.38830 | 4.20550 | 1.80139 | 45.4 | 10.100 |
| 10* | −32.91630 | Variable | | | 10.092 |
| 11* | −126.83080 | 1.00000 | 1.68893 | 31.2 | 9.000 |
| 12* | 27.17400 | Variable | | | 9.092 |
| 13 | 114.19150 | 3.92620 | 1.83480 | 42.7 | 10.974 |
| 14 | −33.79120 | (BF) | | | 11.194 |
| Image surface | ∞ | | | | |

Aspherical data

Surface No. 10

K = 0.00000E+00, A4 = 2.11487E−05, A6 = −4.74672E−08,
A8 = 2.19448E−10 A10 = −5.03837E−13, A12 = 0.00000E+00

Surface No. 11

K = 0.00000E+00, A4 = 3.62979E−05, A6 = −4.48579E−07,
A8 = 2.76766E−09 A10 = −7.32635E−12, A12 = 2.28019E−15

Surface No. 12

K = 0.00000E+00, A4 = 4.29240E−05, A6 = −4.05961E−07,
A8 = 2.90164E−09 A10 = −1.27839E−11, A12 = 3.16035E−14

Various data

| Focal length | 25.6692 |
|---|---|
| F-number | 1.44319 |
| View angle | 22.9335 |
| Image height | 10.8150 |
| Overall length of lens | 60.5607 |
| BF | 18.03332 |

Axial distance data

| d0 | ∞ | 938 | 238 |
|---|---|---|---|
| d10 | 1.9100 | 2.5773 | 4.5173 |
| d12 | 6.2273 | 5.5599 | 3.6200 |

Single lens data

| Lens element | Initial surface number | Focal length |
|---|---|---|
| 1 | 1 | 28.1345 |
| 2 | 3 | −26.6341 |
| 3 | 6 | −10.2953 |
| 4 | 7 | 14.1701 |
| 5 | 9 | 22.4406 |
| 6 | 11 | −32.3981 |
| 7 | 13 | 31.6167 |

Lens unit data

| Lens unit | Initial surface No. | Focal length | Overall length of lens | Front principal points position | Back principal points position |
|---|---|---|---|---|---|
| 1 | 1 | 23.59025 | 29.46390 | 28.45049 | 28.34207 |
| 2 | 11 | −32.39815 | 1.00000 | 0.48633 | 0.89580 |
| 3 | 13 | 31.61672 | 3.92620 | 1.67140 | 3.43160 |

Magnification of lens unit

| Lens unit | Initial surface No. | ∞ | 1000 | 300 |
|---|---|---|---|---|
| 1 | 1 | 0.00000 | −0.02502 | −0.09714 |
| 2 | 11 | 2.62843 | 2.61210 | 2.56276 |
| 3 | 13 | 0.41398 | 0.41324 | 0.41140 |

TABLE 2

(Numerical Example 2)

Surface data

| Surface number | r | d | nd | vd | Effective diameter |
|---|---|---|---|---|---|
| Object surface | ∞ | | | | |
| 1 | 20.30060 | 3.93000 | 1.83481 | 42.7 | 9.322 |
| 2 | 89.46490 | 0.15000 | | | 8.444 |
| 3 | 16.07300 | 1.04510 | 1.50846 | 56.3 | 7.240 |
| 4 | 9.72270 | 5.52680 | | | 6.535 |
| 5(Diaphragm) | ∞ | 4.53410 | | | 6.137 |
| 6 | −11.09480 | 0.70000 | 1.78045 | 24.1 | 5.906 |
| 7 | 60.99120 | 0.92000 | | | 6.515 |
| 8 | 85.13520 | 3.77750 | 1.88300 | 40.8 | 6.981 |
| 9 | −15.84300 | 0.10000 | | | 7.345 |
| 10 | 56.48310 | 2.80000 | 1.88300 | 40.8 | 7.245 |
| 11 | −56.03340 | Variable | | | 7.100 |
| 12 | −455.80430 | 0.80530 | 1.67347 | 28.7 | 6.820 |
| 13 | 18.01680 | Variable | | | 6.994 |
| 14 | 50.85540 | 3.90510 | 1.88300 | 40.8 | 10.297 |
| 15 | −41.00730 | (BF) | | | 10.493 |
| Image surface | ∞ | | | | |

Various data

| | |
|---|---|
| Focal length | 30.0362 |
| F-number | 1.85425 |
| View angle | 19.4978 |
| Image height | 10.8150 |
| Overall length of lens | 55.0786 |
| BF | 18.40474 |

Axial distance data

| d0 | ∞ | 943.5114 | 279.7570 |
|---|---|---|---|
| d11 | 1.5000 | 2.3437 | 4.3800 |
| d13 | 6.9800 | 6.1363 | 4.1000 |

Single lens data

| Lens element | Initial surface number | Focal length |
|---|---|---|
| 1 | 1 | 30.6625 |
| 2 | 3 | −51.2410 |
| 3 | 6 | −11.9770 |
| 4 | 8 | 15.3973 |
| 5 | 10 | 32.2319 |
| 6 | 12 | −25.7174 |
| 7 | 14 | 26.2327 |

Lens unit data

| Lens unit | Initial surface No. | Focal length | Overall length of lens | Front principal points position | Back principal points position |
|---|---|---|---|---|---|
| 1 | 1 | 27.35203 | 23.48350 | 20.73736 | 17.66640 |
| 2 | 12 | −25.71744 | 0.80530 | 0.46260 | 0.78701 |
| 3 | 14 | 26.23271 | 3.90510 | 1.17145 | 2.96050 |

Magnification of lens unit

| Lens unit | Initial surface No. | ∞ | 1000 | 330 |
|---|---|---|---|---|
| 1 | 1 | 0.00000 | −0.02919 | −0.10014 |
| 2 | 12 | 4.18502 | 4.15448 | 4.09114 |
| 3 | 14 | 0.26240 | 0.26224 | 0.26118 |

TABLE 3

(Numerical Example 3)

Surface data

| Surface number | r | d | nd | vd | Effective diameter |
|---|---|---|---|---|---|
| Object surface | ∞ | | | | |
| 1 | 28.87270 | 1.20000 | 1.83481 | 42.7 | 11.644 |
| 2 | 11.20020 | 5.74330 | | | 9.257 |
| 3 | 39.14190 | 1.20000 | 1.48749 | 70.4 | 8.888 |
| 4 | 15.81720 | 9.22000 | | | 8.353 |
| 5 | 40.19020 | 5.80000 | 1.48749 | 70.4 | 8.197 |
| 6 | −17.36590 | 0.25000 | | | 7.950 |
| 7 | 16.99630 | 2.23440 | 1.92286 | 20.9 | 6.880 |
| 8 | 23.33040 | 0.15000 | | | 6.473 |
| 9 | 14.27180 | 0.90000 | 1.48749 | 70.4 | 6.343 |
| 10 | 9.49870 | 5.60000 | | | 5.928 |
| 11(Diaphragm) | ∞ | 4.14220 | | | 5.742 |
| 12 | −13.20030 | 0.77000 | 1.90348 | 23.3 | 5.663 |
| 13 | 54.16530 | 3.55500 | 1.83481 | 42.7 | 6.183 |
| 14 | −16.71490 | 0.15000 | | | 6.613 |
| 15 | 46.74820 | 2.98610 | 1.83481 | 42.7 | 6.798 |
| 16 | −37.73570 | Variable | | | 6.800 |
| 17 | 29.04120 | 0.80000 | 1.84666 | 23.8 | 6.940 |
| 18 | 15.15520 | Variable | | | 6.888 |
| 19 | 27.88570 | 3.81290 | 1.71900 | 53.1 | 9.033 |
| 20 | −71.11320 | (BF) | | | 9.154 |
| Image surface | ∞ | | | | |

Various data

| | |
|---|---|
| Focal length | 12.2982 |
| F-number | 1.85546 |
| View angle | 41.3302 |
| Image height | 9.6300 |
| Overall length of lens | 71.7778 |
| BF | 16.55704 |

Axial distance data

| d0 | ∞ | 926.8299 | 91.6668 |
|---|---|---|---|
| d16 | 1.5100 | 1.7487 | 3.7557 |
| d18 | 5.1969 | 4.9581 | 2.9511 |

Single lens data

| Lens element | Initial surface number | Focal length |
|---|---|---|
| 1 | 1 | −22.6181 |
| 2 | 3 | −55.3828 |
| 3 | 5 | 25.7244 |
| 4 | 7 | 58.0135 |
| 5 | 9 | −62.0982 |
| 6 | 12 | −11.6842 |
| 7 | 13 | 15.6581 |
| 8 | 15 | 25.4212 |
| 9 | 17 | −38.4517 |
| 10 | 19 | 28.3157 |

Lens unit data

| Lens unit | Initial surface No. | Focal length | Overall length of lens | Front principal points position | Back principal points position |
|---|---|---|---|---|---|
| 1 | 1 | 13.96609 | 43.90100 | 22.18150 | 55.19111 |
| 2 | 17 | −38.45172 | 0.80000 | 0.93061 | 1.28564 |
| 3 | 19 | 28.31571 | 3.81290 | 0.63502 | 2.19350 |

TABLE 3-continued (Numerical Example 3)

Magnification of lens unit

| Lens unit | Initial surface No. | ∞ | 1000 | 160 |
|---|---|---|---|---|
| 1 | 1 | 0.00000 | −0.01494 | −0.13983 |
| 2 | 17 | 2.45916 | 2.45444 | 2.41394 |
| 3 | 19 | 0.35808 | 0.35782 | 0.35580 |

TABLE 4

(Numerical Example 4)

Surface data

| Surface number | r | d | nd | vd | Effective diameter |
|---|---|---|---|---|---|
| Object surface | ∞ | | | | |
| 1 | 417.26590 | 1.40670 | 1.48749 | 70.4 | 14.073 |
| 2 | 15.95220 | 16.89000 | | | 11.552 |
| 3 | 25.41240 | 4.20000 | 1.79015 | 47.8 | 9.340 |
| 4 | −66.89890 | 0.25000 | | | 8.860 |
| 5 | 13.20950 | 1.20000 | 1.48749 | 70.4 | 6.900 |
| 6 | 9.13610 | 5.41630 | | | 6.179 |
| 7(Diaphragm) | ∞ | 4.71000 | | | 5.695 |
| 8 | −9.53450 | 0.85000 | 1.63102 | 31.7 | 5.619 |
| 9 | 43.30240 | 4.48060 | 1.73601 | 53.8 | 6.438 |
| 10 | −14.10590 | 0.15000 | | | 6.960 |
| 11 | 143.14960 | 2.84160 | 1.83481 | 42.7 | 7.000 |
| 12 | −34.83740 | Variable | | | 7.136 |
| 13 | 33.34540 | 0.77000 | 1.90426 | 22.5 | 7.100 |
| 14 | 16.68380 | Variable | | | 7.074 |
| 15 | 26.55040 | 4.38840 | 1.77250 | 49.6 | 9.700 |
| 16 | −106.12200 | (BF) | | | 9.791 |
| Image surface | ∞ | | | | |

Various data

| Focal length | 16.4891 |
|---|---|
| F-number | 1.85519 |
| View angle | 33.2665 |
| Image height | 9.8700 |
| Overall length of lens | 71.9424 |
| BF | 17.30921 |

Axial distance data

| d0 | ∞ | 926.6400 | 151.9306 |
|---|---|---|---|
| d12 | 1.5260 | 1.9488 | 4.0015 |
| d14 | 5.5536 | 5.1307 | 3.0780 |

Single lens data

| Lens element | Initial surface number | Focal length |
|---|---|---|
| 1 | 1 | −34.0630 |
| 2 | 3 | 23.7853 |
| 3 | 5 | −67.2696 |
| 4 | 8 | −12.3066 |
| 5 | 9 | 14.9510 |
| 6 | 11 | 33.8085 |
| 7 | 13 | −37.7534 |
| 8 | 15 | 27.8935 |

TABLE 4-continued (Numerical Example 4)

Lens unit data

| Lens unit | Initial surface No. | Focal length | Overall length of lens | Front principal points position | Back principal points position |
|---|---|---|---|---|---|
| 1 | 1 | 19.06111 | 42.39520 | 27.90038 | 50.02446 |
| 2 | 13 | −37.75338 | 0.77000 | 0.82741 | 1.18398 |
| 3 | 15 | 27.89354 | 4.38840 | 0.50271 | 2.37907 |

Magnification of lens unit

| Lens unit | Initial surface No. | ∞ | 1000 | 220 |
|---|---|---|---|---|
| 1 | 1 | 0.00000 | −0.02038 | −0.11856 |
| 2 | 13 | 2.81397 | 2.80677 | 2.76947 |
| 3 | 15 | 0.30742 | 0.30691 | 0.30475 |

TABLE 5

(Numerical Example 5)

Surface data

| Surface number | r | d | nd | vd | Effective diameter |
|---|---|---|---|---|---|
| Object surface | ∞ | | | | |
| 1 | 31.39110 | 8.70000 | 1.86727 | 41.4 | 14.500 |
| 2 | 106.05050 | 0.30000 | | | 12.600 |
| 3 | 22.34120 | 1.96000 | 1.60227 | 34.4 | 11.500 |
| 4 | 15.19480 | 11.12020 | | | 10.300 |
| 5(Diaphragm) | ∞ | 5.75000 | | | 9.031 |
| 6 | −18.20990 | 1.15000 | 1.79315 | 23.8 | 8.628 |
| 7 | 45.78640 | 1.49080 | | | 9.366 |
| 8 | 63.05850 | 6.45400 | 1.88300 | 40.8 | 10.130 |
| 9 | −24.27750 | 0.10000 | | | 10.714 |
| 10 | 49.19470 | 4.90000 | 1.88300 | 40.8 | 10.434 |
| 11 | 1674.43050 | Variable | | | 9.900 |
| 12 | −220.09700 | 0.98000 | 1.60463 | 34.1 | 8.500 |
| 13 | 23.59130 | Variable | | | 8.602 |
| 14 | 78.49360 | 3.29660 | 1.88300 | 40.8 | 11.200 |
| 15 | −51.56840 | (BF) | | | 11.318 |
| Image surface | ∞ | | | | |

Various data

| Focal length | 50.0000 |
|---|---|
| F-number | 1.85406 |
| View angle | 12.0593 |
| Image height | 10.8150 |
| Overall length of lens | 85.9781 |
| BF | 25.61839 |

Axial distance data

| d0 | ∞ | 1913 | 461 |
|---|---|---|---|
| d11 | 2.5000 | 3.6397 | 7.2784 |
| d13 | 11.6581 | 10.5183 | 6.8796 |

Single lens data

| Lens element | Initial surface number | Focal length |
|---|---|---|
| 1 | 1 | 48.7743 |
| 2 | 3 | −87.9381 |
| 3 | 6 | −16.2965 |
| 4 | 8 | 20.5641 |
| 5 | 10 | 57.3185 |
| 6 | 12 | −35.1873 |
| 7 | 14 | 35.6697 |

TABLE 5-continued (Numerical Example 5)

Lens unit data

| Lens unit | Initial surface No. | Focal length | Overall length of lens | Front principal points position | Back principal points position |
|---|---|---|---|---|---|
| 1 | 1 | 45.23426 | 41.92500 | 36.20086 | 26.58546 |
| 2 | 12 | −35.18732 | 0.98000 | 0.55077 | 0.92096 |
| 3 | 14 | 35.66971 | 3.29660 | 1.06928 | 2.59411 |

Magnification of lens unit

| Lens unit | Initial surface No. | ∞ | 2000 | 550 |
|---|---|---|---|---|
| 1 | 1 | 0.00000 | −0.02376 | −0.10004 |
| 2 | 12 | 4.21740 | 4.18489 | 4.09314 |
| 3 | 14 | 0.26209 | 0.26210 | 0.26131 |

TABLE 6

(Numerical Example 6)

Surface data

| Surface number | r | d | nd | vd | Effective diameter |
|---|---|---|---|---|---|
| Object surface | ∞ | | | | |
| 1 | 20.90960 | 3.48760 | 1.83481 | 42.7 | 8.989 |
| 2 | 73.31670 | 0.15000 | | | 8.134 |
| 3 | 19.60710 | 1.00000 | 1.48749 | 70.4 | 7.220 |
| 4 | 9.24460 | 5.38590 | | | 6.351 |
| 5(Diaphragm) | ∞ | 5.47890 | | | 5.884 |
| 6 | −8.77660 | 0.72000 | 1.74463 | 25.4 | 5.964 |
| 7 | −133.00140 | 4.32380 | 1.88300 | 40.8 | 7.039 |
| 8 | −12.70510 | 0.15000 | | | 7.704 |
| 9 | 92.02180 | 2.98800 | 1.83481 | 42.7 | 7.785 |
| 10 | −34.07470 | Variable | | | 7.761 |
| 11 | 109.12330 | 0.80240 | 1.69419 | 27.6 | 6.850 |
| 12 | 19.19240 | Variable | | | 6.984 |
| 13 | 30.68590 | 4.12080 | 1.77250 | 49.6 | 10.263 |
| 14 | −88.81590 | (BF) | | | 10.374 |
| Image surface | ∞ | | | | |

Various data

| Focal length | 26.2626 |
|---|---|
| F-number | 1.85576 |
| View angle | 22.9788 |
| Image height | 10.8150 |
| Overall length of lens | 56.6628 |
| BF | 19.84693 |

Axial distance data

| d0 | ∞ | 941.9300 | 242.7550 |
|---|---|---|---|
| d10 | 1.5100 | 2.3180 | 4.6835 |
| d12 | 6.6985 | 5.8904 | 3.5250 |

Single lens data

| Lens element | Initial surface number | Focal length |
|---|---|---|
| 1 | 1 | 34.0108 |
| 2 | 3 | −37.0534 |
| 3 | 6 | −12.6505 |

TABLE 6-continued (Numerical Example 6)

| 4 | 7 | 15.6445 |
|---|---|---|
| 5 | 9 | 30.1120 |
| 6 | 11 | −33.6703 |
| 7 | 13 | 29.9732 |

Lens unit data

| Lens unit | Initial surface No. | Focal length | Overall length of lens | Front principal points position | Back principal points position |
|---|---|---|---|---|---|
| 1 | 1 | 26.78155 | 23.68420 | 22.45767 | 23.06921 |
| 2 | 11 | −33.67030 | 0.80240 | 0.57680 | 0.90385 |
| 3 | 13 | 29.97319 | 4.12080 | 0.60609 | 2.36656 |

Magnification of lens unit

| Lens unit | Initial surface No. | ∞ | 1000 | 300 |
|---|---|---|---|---|
| 1 | 1 | 0.00000 | −0.02856 | −0.11232 |
| 2 | 11 | 3.51078 | 3.49510 | 3.45130 |
| 3 | 13 | 0.27932 | 0.27859 | 0.27630 |

The following Table 7 shows the corresponding values to the individual conditions in the inner focus lenses of each of Numerical Examples.

TABLE 7

(Values corresponding to conditions)

| | Numerical Example | | | | | |
|---|---|---|---|---|---|---|
| Condition | 1 | 2 | 3 | 4 | 5 | 6 |
| (1) $|f_2/f|$ | 1.262 | 0.847 | 3.127 | 2.290 | 0.704 | 1.283 |
| (2) $f_{23}/f_I$ | 4.943 | 2.934 | 5.035 | 3.564 | 2.255 | 3.461 |
| (3) SF | −0.048 | 0.066 | 0.163 | 0.021 | −0.310 | −0.026 |
| (4) $D_2/\{f \times \tan(\omega)\}$ | 0.092 | 0.076 | 0.074 | 0.071 | 0.092 | 0.072 |
| (5) $f_{sb}/f$ | 0.820 | 0.873 | 1.883 | 1.386 | 0.770 | 0.883 |
| (6) $|(1 − \beta_2) \times \beta_3|$ | 0.674 | 0.836 | 0.522 | 0.558 | 0.843 | 0.701 |

The inner focus lens according to the present invention is applicable to a digital still camera, a digital video camera, a camera for a mobile terminal device such as a smart-phone, a surveillance camera in a surveillance system, a Web camera, a vehicle-mounted camera or the like. In particular, the inner focus lens according to the present invention is suitable for a photographing optical system where high image quality is required like in a digital still camera system or a digital video camera system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An inner focus lens, in order from an object side to an image side, comprising:
   a first lens unit having positive optical power;
   a second lens unit having negative optical power; and
   a third lens unit having positive optical power, wherein
     the second lens unit is moved along an optical axis so that focusing from an infinite-distance object side to a short-distance object side is achieved,
     the first lens unit includes a bi-convex air lens, and the following conditions (1) and (2) are satisfied:

$$0.65 < |f_2/f| < 5.00 \quad (1)$$

$$0.5 < f_{23}/f_1 < 9.0 \quad (2)$$

where, $f_2$ is a focal length of the second lens unit, f is a focal length of the entire system in an infinity in-focus condition, $f_{23}$ is a composite focal length of the second lens unit and the third lens unit in an infinity in-focus condition, and $f_1$ is a focal length of the first lens unit.

2. The inner focus lens as claimed in claim 1, wherein the following condition (3) is satisfied:

$$-0.5 < SF < 0.5 \quad (3)$$

where, $SF=(Ra+Rb)/(Rb-Ra)$,

Ra is a radius of curvature of an object side surface of the bi-convex air lens included in the first lens unit, and Rb is a radius of curvature of an image side surface of the bi-convex air lens included in the first lens unit.

3. The inner focus lens as claimed in claim 1, wherein the second lens unit is composed of a single unit having negative optical power.

4. The inner focus lens as claimed in claim 3, wherein the single unit having negative optical power is composed of one single lens element having negative optical power.

5. The inner focus lens as claimed in claim 1, wherein the following condition (4) is satisfied:

$$0.02 < D_2/\{f \times \tan(\omega)\} < 0.30 \quad (4)$$

where, $D_2$ is an optical axial thickness of the second lens unit, f is a focal length of the entire system in an infinity in-focus condition, and ω is a half view angle (°) of the entire system in an infinity in-focus condition.

6. The inner focus lens as claimed in claim 1, having an aperture diaphragm for restricting axial light beam, wherein the following condition (5) is satisfied:

$$0.5 < f_{sb}/f < 3.0 \quad (5)$$

where, $f_{sb}$ is a composite focal length of lens elements located on the image side relative to the aperture diaphragm in an infinity in-focus condition, and f is a focal length of the entire system in an infinity in-focus condition.

7. The inner focus lens as claimed in claim 1, wherein the following condition (6) is satisfied:

$$0.2 < |(1-\beta_2) \times \beta_3| < 0.9 \quad (6)$$

where, $\beta_2$ is a lateral magnification of the second lens unit in an infinity in-focus condition, and $\beta_3$ is a lateral magnification of the third lens unit in an infinity in-focus condition.

8. An interchangeable lens apparatus comprising:

an inner focus lens as claimed in claim 1; and a lens mount section which is connectable to a camera body including an image sensor for receiving an optical image formed by the inner focus lens and converting the optical image into an electric image signal.

9. A camera system comprising:

an interchangeable lens apparatus including an inner focus lens as claimed in claim 1; and a camera body which is detachably connected to the interchangeable lens apparatus via a camera mount section, and includes an image sensor for receiving an optical image formed by the inner focus lens and converting the optical image into an electric image signal.

* * * * *